(12) United States Patent
Rutkowski

(10) Patent No.: US 6,389,325 B1
(45) Date of Patent: May 14, 2002

(54) APPARATUS INCLUDING A USER INTERFACE FOR THE CONTROL OF A MACHINE TOOL

(75) Inventor: Christian Rutkowski, Traunstein (DE)

(73) Assignee: Dr. Johannes heidenhain GmbH, Traunreut (DE)

(*) Notice: Subject to any disclaimer, the term of this patent is extended or adjusted under 35 U.S.C. 154(b) by 0 days.

(21) Appl. No.: 09/013,153

(22) Filed: Jan. 26, 1998

(30) Foreign Application Priority Data

Feb. 6, 1997 (DE) ......................................... 197 04 416

(51) Int. Cl.[7] ............................................. G05B 15/00
(52) U.S. Cl. ........................... 700/180; 17/175; 17/178; 17/179; 17/83; 17/185; 318/565; 318/567; 318/590; 345/700; 345/701
(58) Field of Search ........................... 700/83, 80, 159, 700/172, 175, 177, 178, 179, 17, 180, 185; 318/560, 565, 567, 590, 575; 345/700–710

(56) References Cited

U.S. PATENT DOCUMENTS

| | | | | |
|---|---|---|---|---|
| 4,514,814 A | * | 4/1985 | Evans | 700/180 |
| 4,589,068 A | * | 5/1986 | Heinen, Jr. | 700/87 |
| 4,639,916 A | * | 1/1987 | Boutterin et al. | 371/16 |
| 4,992,948 A | * | 2/1991 | Pilland et al. | 700/173 |
| 5,159,558 A | * | 10/1992 | Seki et al. | 700/185 |
| 5,252,899 A | | 10/1993 | Kawamura et al. | 318/568.1 |
| 5,341,459 A | * | 8/1994 | Backes | 700/245 |
| 5,386,360 A | * | 1/1995 | Wilson et al. | 700/17 |
| 5,430,360 A | * | 7/1995 | Rosenthal et al. | 318/565 |
| 5,631,825 A | * | 5/1997 | Van Weele et al. | 700/83 |
| 5,742,504 A | * | 4/1998 | Meyers et al. | 700/83 |
| 5,749,058 A | * | 5/1998 | Hashimoto | 700/83 |
| 5,793,963 A | * | 8/1998 | Tapperson et al. | 709/201 |
| 5,889,672 A | * | 3/1999 | Cshuler et al. | 700/83 |

FOREIGN PATENT DOCUMENTS

DE 195 15 198 A1 10/1996

OTHER PUBLICATIONS

H–J Rabe, et al., "Veredelt CNC–Bahnsteuerung unter Windows," Elecktronik Praxis—Nr. 7, pp. 134–136, Apr. 14, 1994.
Wöhrmann, Offene Steuerung mit >WINDOWS< Fertigung, pp. 32–34, Dec. 1994.

* cited by examiner

*Primary Examiner*—William Grant
*Assistant Examiner*—Ramesh Patel

(57) ABSTRACT

An apparatus for the control of a machine tool includes, for the processing of a workpiece, several separate processing units that can execute definite tasks simultaneously and independently of one another. Furthermore, a display unit, as well as at least one assigned input unit, is provided. On the display unit side at least one display window, which can be activated selectively and in which corresponding information can be presented visually, is assigned to each processing unit. The display window active at the moment is thus shown uncovered and/or marked for emphasis.

24 Claims, 2 Drawing Sheets

APPARATUS INCLUDING A USER INTERFACE FOR THE CONTROL OF A MACHINE TOOL

BACKGROUND OF THE INVENTION

1. Field of the Invention

The present invention relates to an apparatus including a user interface for the control of a machine tool, and more particularly, to a user interface for the visual presentation of machine tool information to the user of the apparatus.

2. Relevant Art

Along with machine tools that can execute merely a single task at a particular time, machine tools with several processing units are known in the art in which particular tasks can be executed simultaneously and independently of one another. For example, the particular tasks may include the simultaneous grinding and dressing of a grinding wheel or the simultaneous ram-type electrical discharge machining and milling of an additional eroding electrode. In addition, there exist varied additional possibilities for executing particular tasks independently of one another on separate processing units of one machine tool. In order to accomplish this, it is desirable to present visually various information that is assigned to the different processing units, i.e., graphic representations of the current processing situation or of the current state of operation, among many other things. It must furthermore be ensured, from the control side of a machine tool, that inputs provided by a user are assigned to the desired processing unit. In particular, the user should be able to recognize without difficulty which of the available processing units the inputs made or intended to be made actually relate.

U.S. Pat. No. 5,252,899 discloses a numerical control for a machine tool that includes several controllers. The various controllers can manage various control tasks all at once and are also suited for parallel processing of various processing tasks of one machine tool. Through a bus structure the controllers are connected to various peripheral components among which is also a display unit which includes an input unit. The display and input unit can consequently be utilized by each of the controllers provided. Details regarding the visual presentation of the information for the various processing units as well assigning inputs to a definite processing unit are not disclosed.

It is thus an object of the present invention to provide an apparatus including a user interface for the control of a machine tool that includes several separate processing units that can execute particular tasks simultaneously and independently of one another on a workpiece with a visual presentation of information relating to each processing unit.

SUMMARY OF THE INVENTION

In a preferred embodiment of the present invention, window technology is henceforth employed for the visual presentation of information of interest on a display unit. On the display unit side at least one display which can be selected or activated by the user and in which various information for the various processing units can be represented, is assigned to each processing unit. Context-related input capabilities referring to each display window are provided for the user. Simultaneously it is ensured that the entered inputs are assigned to the desired processing unit by the user or it is unambiguously evident to the user to which processing unit the inputs entered or to be entered relate.

Consequently, within the inventive apparatus for the control of a machine tool with several processing units, technologies for visually presenting information are employed that are known in the art from operating or user interfaces such as MICROSOFT™ WINDOWS™. The use of technologies of this type permits an intuitive operation of the machine tool in question connected with the capability of always simply informing oneself of the current state of operation of a processing unit or showing other information of interest.

Machine tool controls using WINDOWS™ are already known in the art. In general, for example, reference is made to see Rabe, H. J., "Veredelt—CNC Bahnsteuerung unter Windows" [*Enhanced CNC Path Control under WINDOWS*] Elektronik Praxis Nr. 7, pp. 134–136, Apr. 14, 1994. There is no disclosure, however, of a machine tool control with several processing units.

Further advantages as well as details of the preferred embodiments of the present invention follow from the following description of preferred embodiments with the aid of the accompanying figures.

DETAILED DESCRIPTION OF THE PRESENTLY PREFERRED EMBODIMENTS

Figure 1:
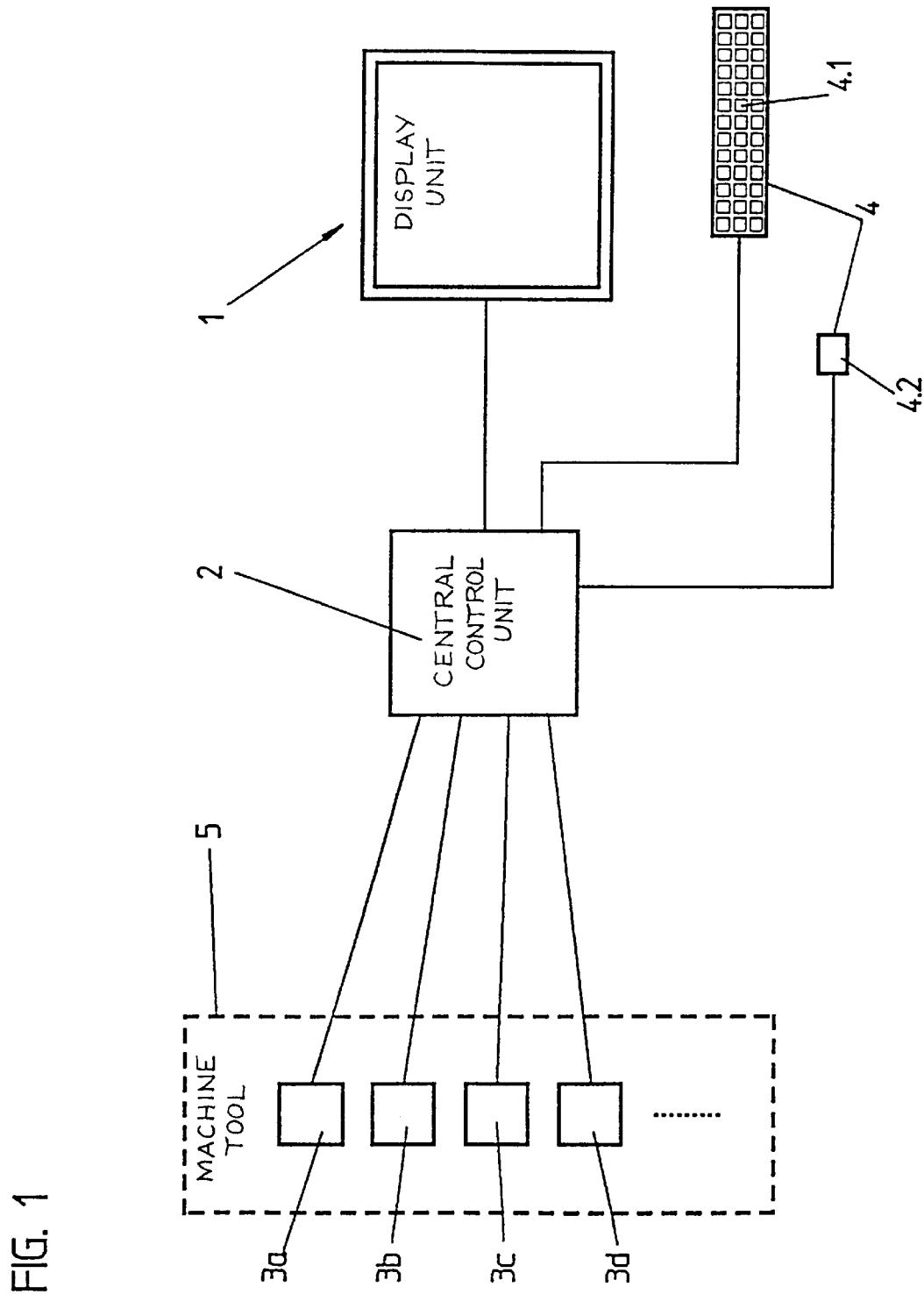
FIG. 1 is a schematic representation of a machine tool control apparatus according to a preferred embodiment of the present invention.

FIG. 1 is a schematic representation of a machine tool control apparatus according to a preferred embodiment of the present invention. Included is a central control unit 2, several separate processing units 3*a*, 3*b*, 3*c*, and 3*d* associated with a machine tool 5, a display unit 1 and an input unit 4. The separate processing units 3*a*–3*d* of the machine tool 5 can execute various processing functions simultaneously and independently of one another as is well known to those of ordinary skill in the art. For example, the processing units may perform the simultaneous grinding and dressing of a grinding wheel or the simultaneous ram-type electrical discharge machining and milling of an additional eroding electrode, as already mentioned initially, or the simultaneous multi-carriage processing on lathes, and so on. The inventive apparatus can be realized on various types of machine tools.

The control of the various processing units 3*a*, 3*b*, 3*c*, and/or 3*d* of the machine tool 5 is accomplished by the central control unit 2 which can be equipped for this purpose with different processors but also provides for parallel processing in multitasking mode.

The display unit 1 may be in the form of a computer monitor, for example. In a preferred embodiment the input unit 4 includes a computer keyboard 4.1 as well as an optional pointer device 4.2, preferably in the form of a mouse or a track ball. Through the input units 4, the user accomplishes the input of commands and/or data that are processed further by the central control unit 2 perhaps to program desired processing of a workpiece, to visually present particular information on the display unit 1, and so on as will be described in detail hereinafter.

Figure 2:
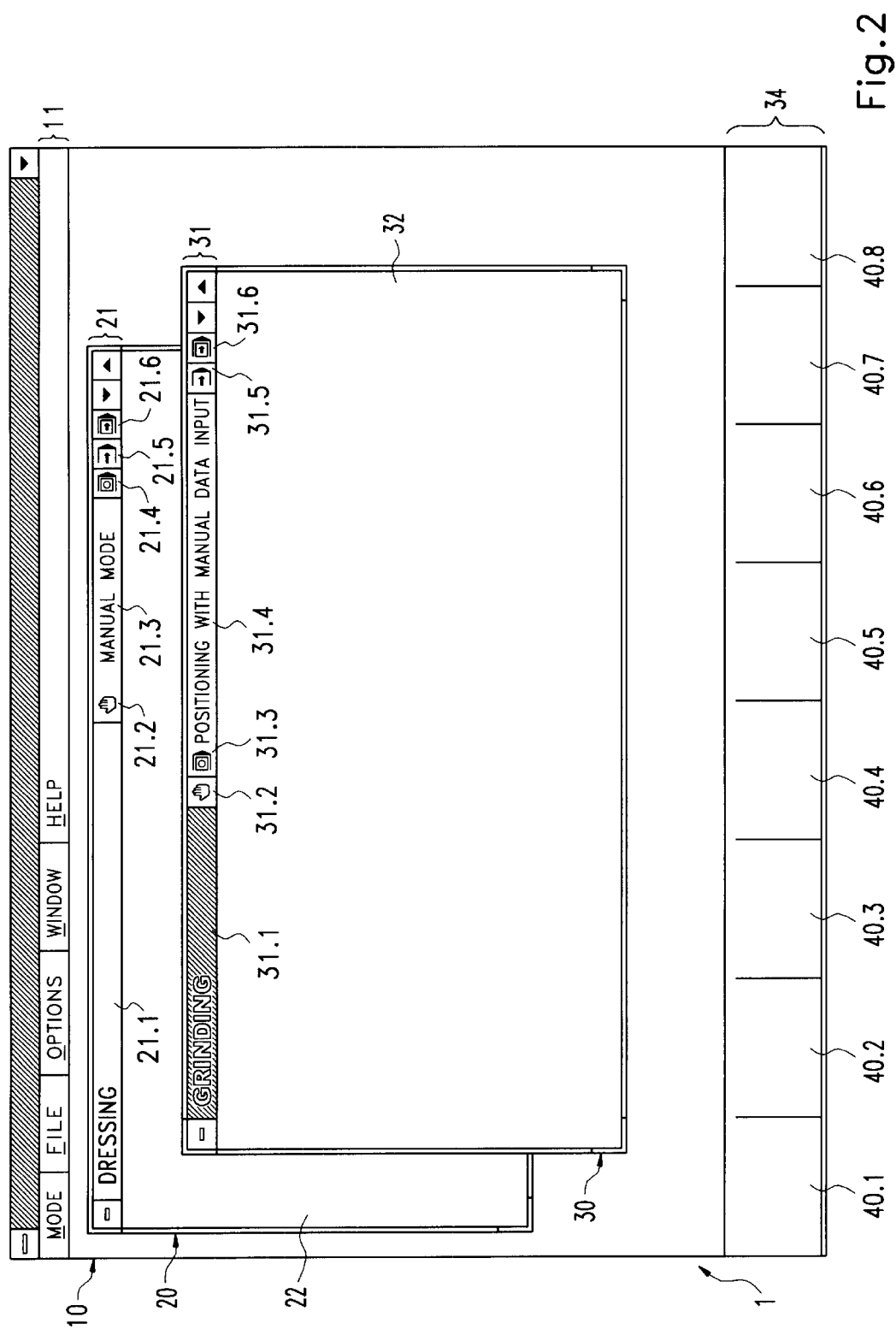
FIG. 2 is an illustration of a display of a display unit according to a preferred embodiment of the present invention.

FIG. 2 is an illustration of a display of the display unit according to a preferred embodiment of the present invention. On the display 10 of the display unit 1 are two display windows 20, 30, that are each assigned to different processing units or processing tasks of the respective machine tool which can be executed simultaneously. Consequently, a display window such as 20, 30 is assigned to each of the processing units provided with the machine tool.

For each of the available display windows 20, 30 there exist definite context-related input capabilities that can be invoked by the available input units such as the keyboard 4.1 or mouse 4.2. In the preferred embodiment shown, a selection menu in a title line 11 and a row of softkeys 34 with a series of softkeys 40.1–40.8 are provided for context-related input capability. The user provides inputs by selecting particular ones of these input capabilities. These input capabilities are each always related to a definite display window 20, 30, that is, the submenus assigned to the menu items in title line 11 as well as the specifications in the Softkey line 34 vary according to the display window 20,30. The various menu items "MODE OF OPERATION", "FILE", "OPTIONS", WINDOW", and "HELP" in the title line 11 of the display unit 1 can be selected according to the prior art by the available input units 4.1 and/or 4.2. By way of example, it is possible to select these by using the mouse and a corresponding cursor just as well as by definite keyboard combinations. For each menu item a submenu, in the form of a pull-down menu, is available, after appropriate activation, whose individual menu items can be selected or activated according to the prior art just as the menu items of the title line 11. The activation of the various menu items in the title line 11 are consequently oriented to known PC user interfaces so that simple operation results for the user.

The additional context-related input capability of the Softkey line 34 provides for utilizing definite function keys on the keyboard in order to activate the desired functions, for example, the keys F1–F12 on a traditional computer keyboard. The various function keys F1–F12 can be assigned the most varied functions relating to the respective processing units.

In the following example the illustrated structure or content of the display window 20, 30 for the various processing units of the respective machine tool will be described. In a preferred embodiment the display widows 20, 30 all have in principle a two-part structure consisting of a title line 21, 31 and a display area 22, 32. The title lines 21, 31 of the various display windows 20, 30 include at least one title area 21.1, 31.1 in which, for example, the designation of the corresponding processing unit or processing function is disposed. In a preferred embodiment the concrete designation with text for the corresponding processing function is displayed in each of the two title areas 21.1 and 31.1, namely for the one "GRINDING" and for the other "DRESSING". Of course, alternatively a suitable graphical symbol can be displayed instead of or in combination with text in the title area 21.1, 31.1 in order to make clear to which processing unit the display window 20, 30 corresponds.

Along with the title areas 21.1, 31.1, the title lines 21, 31 of the display window 20, 30 furthermore have operation state areas 21.2–21.6, 31.2–31.6 that can be activated or selected by the user by the various input units. The operation state areas 21.2–21.6, 31.2–31.6 of a display window 20, 30 include in this example preferably the various possible operation states or modes of operation for a processing unit. In the preferred embodiment shown, for each possible mode of operation of a processing unit, a graphical symbol is available that is understandable to the user even without corresponding text and makes clear each of which modes of operation are possible for the corresponding processing unit. The mode of operation active or current at the moment is displayed in the title line 21, 31 preferably in text as well as with a symbol in one of the operating state areas 21.3, 31.4 so that the operating state of a processing unit at the moment can be recognized by the user without difficulty.

Along with the particular form of the title line 21, 31 shown in FIG. 2, in particular the disposition of the various operating state areas 21.2–21.6, 31.2–31.6, it is also possible to display information relating to the mode of operation active at the moment. For example, it is possible to provide merely a single operation state area in the title line 21, 31 in which the mode of operation active at the moment is displayed in text and/or graphics. Further possible and selectable operating states are on the other hand selectable in the form of submenus with pull-down menus, for example.

The areas in the title lines 21, 31 at the left and right edge that preferably can be activated by the pointer device or the mouse, serve for closing, enlarging, and reducing the display window as is well known to those of ordinary skill in the art.

In the display areas 22, 32 of the available display window 21, 31 various information relating to the processing unit associated with the display window 20, 30 is offered or presented visually to the user. For example, the display of particular user inputs, the display of the positions of machine axes, the representation of executed NC programs, the graphical representation of the workpiece, status information relating to the tool and/or the machine tool, workpiece processing simulations, among many other types of information can be displayed. In the display areas 22, 32 various types of information can consequently be presented visually to the respective user.

The display windows 20, 30 provided for the various processing units can optionally be activated by the respective user during the simultaneous execution of various processing tasks. Further connected with the activation of a particular display window, for example display window 30 as shown in FIG. 2, is the fact that this respective display window 30 is represented uncovered on the display unit. Non-activated display windows, such as display window 20, for example, can be represented partly or totally covered by the activated window. In FIG. 2 display window 30 is activated at the moment and partly covers non-activated display window 20. Alternatively it is of course possible to represent even non-activated display windows uncovered on the display unit if the window sizes are suitably chosen. In this case it is in addition desirable to mark the activated display windows for emphasis. This can be done by representing the title areas 21.1, 31.1 emphasized by color such as is also shown in the preferred embodiment of FIG. 2 where the title area 31.1 of the activated display window 30 is shown in inverse color with respect to the title area 21.1 of the non-activated display window. Of course, the emphasis of the display window 30 activated at the moment can also be accomplished in other ways.

Further connected with the activation of a display window 30 is the fact that the context-related input capabilities are assigned to this display window 30 or to the corresponding processing unit. In the preferred embodiment shown, the input capabilities are provided by the title line 11 as well as by the Softkey line 34. Inputs by way of these input capabilities consequently relate to the respective processing unit and the functions of these input capabilities connected with this processing unit.

Also the additional inputs, preferably by way of the keyboard, relate to the display window currently activated and the corresponding processing unit. This relates perhaps to the input of commands, coordinates, etc. according to which information is presented visually in the display area 32 of the activated display window 30 and to which inputs in this connection are provided.

The actual activation of the desired display window 20, 30 can be accomplished by the user in various ways. For example, it is possible to provide for this purpose in the title line 11 an activation area in the form of a menu item whose submenu items are the various available processing units' respective display windows. For activation of this type, the menu item "WINDOW" can perhaps be provided in the title line 11. Furthermore, the activation of a display window can be done by way of Softkeys. In addition the activation of a display window is possible on the display unit by way of the pointer device. For example, a particular display window can be activated in connection with pressing a mouse key if the mouse pointer is placed in the title area 21.1, 31.1, for example.

For each processing unit or each processing channel of the machine tool there exists moreover a series of possible operating states or modes of operation. In each case it is a matter of a combined group of possible activities, for example, the generation of an NC program, manual operation, positioning with manual input, program execution, and so on. At least the just active operating state is shown in the title line 21, 31 of the display window 20, 30 in an operating state area 21.3, 31.4, which is done in the preferred embodiment of FIG. 2 in the form of text. Along with the active operating state shown in text, it is also possible to visually present the operating states in graphical form in the title line, i.e., by suitable symbols. Of course, merely a portion of the possible operating states can also be displayed in this form and so on.

The selection of a desired operating state or a desired mode of operation within the display window 30 activated at the moment can be also done again in various ways. Thus in the preferred embodiment shown in FIG. 2 it is possible by placing a cursor or mouse pointer on one of the graphical symbols in the operating state areas 31.2–31.6 and pressing a mouse key, for example, to select the desired mode of operation that then in turn is presented visually as emphasized text. Alternatively the selection of the mode of operation can also be done by activating the menu item "MODE OF OPERATION" in the title line 11 that represents one of the context-related input capabilities mentioned initially, that is, is related to the currently activated display window 30. For this menu item there is once again a pull-down menu with the various possible modes of operation as selection options. The selection of the current state of operation from this pull-down menu is done by way of the keyboard or the mouse. Connected in turn with the activation of a particular operating state is the fact that commands and inputs done subsequently are organized in a form that is specific to the respective processing unit. Likewise the display of data in the display area, provided if necessary, is specifically organized relating to the respective mode of operation.

With the aid of the inventive measures for an apparatus for the control of machine tools with several processing units, a user interface thus results that can be operated and adapted to various machine configurations simply or intuitively.

It is to be understood that the forms of the invention described herewith are to be taken as preferred examples and that various changes in the shape, size and arrangement of parts may be resorted to without departing from the spirit of the invention or scope of the claims.

What is claimed is:

1. A machine tool control system, the system comprising:
   a machine tool;
   a plurality of separate processing units coupled to the machine tool for processing a workpiece with the machine tool wherein the plurality of separate processing units can execute tasks simultaneously and independently of one another;
   a control unit coupled to the plurality of separate processing units;
   a display unit coupled to the control unit wherein each one of the plurality of separate processing units is assigned to at least one display window that can be activated and displayed on the display unit selectively and in which information corresponding to the processing unit to which the at least one display window relates can be represented visually whereby the display window active at the moment is shown uncovered and/or marked for emphasis.

2. The system according to claim 1 wherein for each of the at least one display windows context-related input capabilities are provided that are specific to the corresponding one of the plurality of separate processing units.

3. The system according to claim 2 wherein each of the context-related input capabilities is a selection menu in a title line having one or more pull-down menus.

4. The system according to claim 2 wherein each of the context-related input capabilities is a SoftKey line.

5. The system according to claim 1 wherein each one of the at least one display window induces a title line as well as a display area.

6. The system according to claim 5 wherein the title line includes a text designation of the corresponding one of the plurality of separate processing units shown in a title area.

7. The system according to claim 6 wherein the title line also includes a graphical symbol of the corresponding one of the plurality of separate processing units shown in the title area.

8. The system according to claim 6 wherein the title area of the display window activated at the moment is marked for emphasis.

9. The system according to claim 5 wherein the title line includes a graphical symbol of the corresponding one of the plurality of separate processing units shown in a title area.

10. The system according to claim 5 wherein the title line includes a text designation of the corresponding processing unit shown in operating state areas.

11. The system according to claim 10 wherein the title line includes a graphical symbol of the corresponding one of the plurality of separate processing units shown in the operating state areas.

12. The system according to claim 5 wherein the title line includes a graphical symbol of the corresponding one of the plurality of separate processing units shown in operating state areas.

13. The system according to claim 1 wherein a selection menu with all possible display windows is provided for selective activation of a display window.

14. The system according to claim 5 wherein an input formed as a pointer device is provided for the selective activation of a display window by pressing a key on an input unit when a pointer of a pointer device is placed in a title area of the title line of the display window.

15. The system according to claim 1 wherein several operation states may be selected for each processing unit in each activated display window.

16. A machine tool control system, the system comprising:
   a machine tool;

a plurality of separate processing units coupled to the machine tool for processing a workpiece with the machine tool wherein the plurality of separate processing units can execute tasks simultaneously and independently of one another;

a control unit coupled to the plurality of separate processing units;

a display unit coupled to the control unit wherein each one of the plurality of separate processing units is assigned at least one display window that can be activated and displayed on the display unit selectively and in which information corresponding to the processing unit to which the at least one display window relates can be represented visually whereby the display window active at the moment is shown uncovered and/or marked for emphasis;

wherein for each of the at least one display windows several context-related input capabilities are provided that are specific to the corresponding one of the plurality of separate processing units.

17. The system according to claim 16 wherein each of the context-related input capabilities is a selection menu in a title line having one or more pull-down menus.

18. The system according to claim 17 wherein each of the context-related input capabilities is a SoftKey line.

19. The system according to claim 16 wherein a selection menu with all possible display windows is provided for selective activation of a display window.

20. The system according to claim 16, further comprising a computer keyboard coupled to the control unit, wherein the computer keyboard comprises one or more function keys that are assigned and activate various functions relating to the plurality of separate processing units.

21. A machine tool control system, the system comprising:

a machine tool;

a plurality of separate processing units coupled to the machine tool for processing a workpiece with the machine tool wherein the plurality of separate processing units can execute tasks simultaneously and independently of one another;

a control unit coupled to the plurality of separate processing units;

a display unit coupled to the control unit wherein each one of the plurality of separate processing units is assigned at least one display window that can be activated and displayed on the display unit selectively and in which information corresponding to the processing unit to which the at least one display window relates can be represented visually whereby the display window active at the moment is shown uncovered and/or marked for emphasis;

whereas there are various activators that activate the desired display window by the user.

22. The system according to claim 21 wherein a selection menu with all possible display windows is provided for selective activation of a display window.

23. The system according to claim 21 wherein an input formed as a pointer device is provided for the selective activation of a display window by pressing a key on an input unit when a pointer of a pointer device is placed in a title area of a title line of the display window.

24. The system according to claim 21, wherein softkeys are coupled to the control unit and selective activate a display window.

* * * * *

UNITED STATES PATENT AND TRADEMARK OFFICE
CERTIFICATE OF CORRECTION

PATENT NO. : 6,389,325 B1
DATED : May 14, 2002
INVENTOR(S) : Christian Rutkowski It is certified that error appears in the above-identified patent and that said Letters Patent is hereby corrected as shown below:

Column 8,
Line 32, delete "selective" and substitute -- selectively -- in its place.

Signed and Sealed this

Eleventh Day of February, 2003

JAMES E. ROGAN
*Director of the United States Patent and Trademark Office*